April 25, 1939.  C. H. PARSONS  2,155,736
CHEESE PACKAGE
Filed Oct. 21, 1937
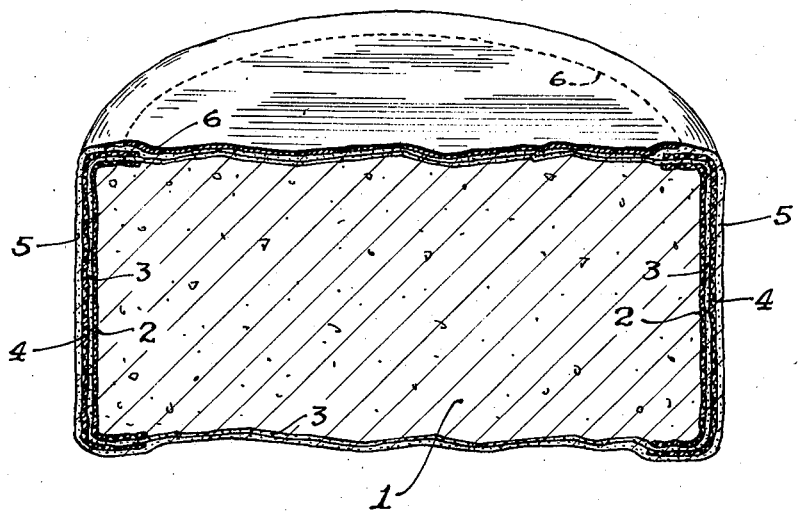
ATTEST-
Wm C. Meiser
Clinton H. Parsons
INVENTOR
BY Tony W. Johns
ATTORNEY Patented Apr. 25, 1939

2,155,736

UNITED STATES PATENT OFFICE 2,155,736

CHEESE PACKAGE

Clinton H. Parsons, Chicago, Ill., assignor to Industrial Patents Corporation, Chicago, Ill., a corporation of Delaware Application October 21, 1937, Serial No. 170,263

4 Claims. (Cl. 99—178)

This invention relates to cheese packages and to cheese packing methods.

Among the objects of the invention are the provision of a new cheese package and a method for packaging cheese whereby the cheese is more adequately protected than is cheese packed by heretofore known methods.

The present invention is of especial value with respect to the packaging of cheese which has not been pasteurized.

In the manufacture of cheese of the firm bodied types, curd is pressed in a mold which has been lined partially or entirely with cheese cloth. The shape of the mold depends upon trade preference in the locality in which the ultimate product is to be marketed. It is usual to prepare cheese in the form of blocks or cylinders, most cheese being molded in the form of cylinders of varying sizes such as midgets, twins, daisies, cheddars, wheels, and longhorns.

The generally accepted method of forming cheese in the form of cylinders is to press the curd into a cylindrical mold, the sides of which have been lined with cheese cloth of sufficient length to slightly overlap the ends of the formed cheese.

After the curd has been in the mold under pressure a sufficient length of time to set, it is removed and placed on end on a shelf to surface dry, after which the cylinder of curd is dipped in paraffin and stored to age. Mild cheese is usually aged about sixty days, and the better grades of cheese for more extended periods up to approximately two years.

Due to the chipping and cracking of paraffin, small areas of the cheese are sometimes exposed and mold forms on the older cheeses. As a result of handling in the aging process, cheese also becomes surface soiled. The present invention contemplates further steps in treating the cheeses after aging whereby they are more adequately protected against handling in subsequent storage, during shipment, and in retail stores.

In carrying out the method of the present invention the cheese is thoroughly wiped to remove clinging surface dirt, although it is not necessary to remove all signs of mold. The preferred method will be described as applied to cheese in cylindrical form. After cleaning, a suitable cloth bandage of sufficient length to cover the periphery of the cylinder and of sufficient width to overlap slightly at each end is applied to the periphery. This may be manually done by wrapping the bandage around the cheese and holding it in place at the overlap by inserting the teeth of a comb, which may be made by driving several nails through a stick of wood.

The outer bandage, it will be noted, is applied over the paraffin with which the cheese was originally treated. The bandaged cheese is then dipped in hot wax and the edges of the bandage folded over and pressed against the ends of the cheese. The wax sets promptly, resulting in a cheese package in which any mold stains which have formed are visible, indicating the aged condition of the cheese. However, since any mold present is entrapped beneath the outer layer of wax, it is prevented from spreading. Furthermore, the wax which is applied in carrying out this process penetrates the interstices of the subsequently applied bandage, firmly anchoring the bandage to the paraffin beneath.

It must be borne in mind that the bandage which is originally placed upon the cheese is placed in the mold and becomes embedded in the curd so that the praffin, which is applied to the cheese before aging, covers the surface of the cheese and cheese cloth and does not substantially penetrate the cloth. On the contrary, the bandage applied in accordance with the present invention is permeated with the subsequently applied wax, giving the wax a strength it would not otherwise have on the sides of the cheese which are normally subjected to the roughest usage in handling.

I prefer to employ a wax which is less brittle than paraffin at lower temperatures and is not tacky at higher temperatures. Such a wax is described in my copending application entitled Wax, filed October 21, 1937, Serial No. 170,264.

If desired the outer bandage may be of sufficient size and shape as to entirely cover the cheese. Suitable labels may also be applied on the side of the cheese or on one or both of the ends. When labeling cheeses prepared in accordance with this method, I prefer to employ a paper label. The label may, of course, be applied by any appropriate method. I prefer, however, to employ the method described and claimed in my copending application entitled Label, filed October 27, 1937, Serial No. 171,383. In accordance with this method a paper label is dipped in hot wax and then applied at any desired place on the rewaxed cheese, being ironed in place with a hot iron.

The cheese package of the present invention will be better understood by reference to the drawing, which is a perspective view partly in section.

The cheese 1 is covered on the sides with the originally applied bandage 2 embedded in the cheese, a paraffin coating 3, which is applied before aging, subsequently applied bandage 4, subsequently applied wax 5, and label 6 embedded in the subsequently applied wax. In order that the invention might be more readily understood, the various covering materials shown in the drawing are somewhat enlarged.

Cheese in the ordinary cheese cloth and paraffin covering as it is usually marketed is often unprotected by refrigeration during the particular period of time that it is being offered for sale. As a result, it is often held under adverse temperature conditions for a period of from a few hours to several days, during which time the cheese becomes soft and oil oozes out. The protection afforded by the covering of the present invention prevents such adverse effects.

The secondary bandage which is applied in accordance with this invention may be of any desired color and bear any desired design. The scope of the invention is not limited to the appearance of the cloth or to its particular texture. However, the preferred secondary bandage is made from an open mesh cloth of the marquisette type. A very pleasing package results if the secondary bandage bears a distinctive design such, for example, as a red and white plaid. The appearance of the package may also be altered and in some instances enhanced by tinting the secondary wax.

It will be understood, of course, that the term "secondary" is applied to the bandage and to the wax placed on the outside of the original paraffining of the cheese in accordance with the present invention.

I have found that the cloth which adheres most readily when employed for the secondary bandage is one having a mesh of about one-sixteenth inch and possessing very little tensile strength in the individual threads. It will be readily appreciated that the cloth must have a mesh sufficiently open to permit ready permeation of the secondary wax, which by virtue of its heat binds to the original paraffin. In some instances, particularly where a closer mesh cloth is employed, it is desirable to apply a hot iron to the secondary cloth before dipping in wax. The heat of the iron passes through the cloth and melts the paraffin below to some extent, thus providing an anchorage for the secondary bandage. With an open mesh cloth the ironing step is unnecessary.

I claim:

1. A cheese package comprising a body of cheese, a cheese bandage on the surface of the cheese, a coating of paraffin thereover, a secondary open mesh fabric bandage on the surface of the paraffin, and a secondary coating of wax over and embedded within the interstices of the secondary bandage.

2. In a cheese package comprising a body of cheese, a cheese bandage and a coating of paraffin, a secondary outer, open mesh fabric bandage and a secondary outer coating of wax embedded within the interstices of the secondary bandage.

3. A method of bandaging aged cheese which is coated with a cheese bandage and paraffin which comprises applying a secondary open mesh fabric bandage over the paraffin and applying a coating of wax thereover, the wax coating being embedded within the interstices of the secondary bandage.

4. A method of packaging aged cheese which is covered with paraffin which comprises applying an open mesh fabric bandage thereto, holding the bandage in position, dipping in hot wax, and permitting the wax to solidify to embed the bandage therein and hold the bandage in position.

CLINTON H. PARSONS.